Figure 1:
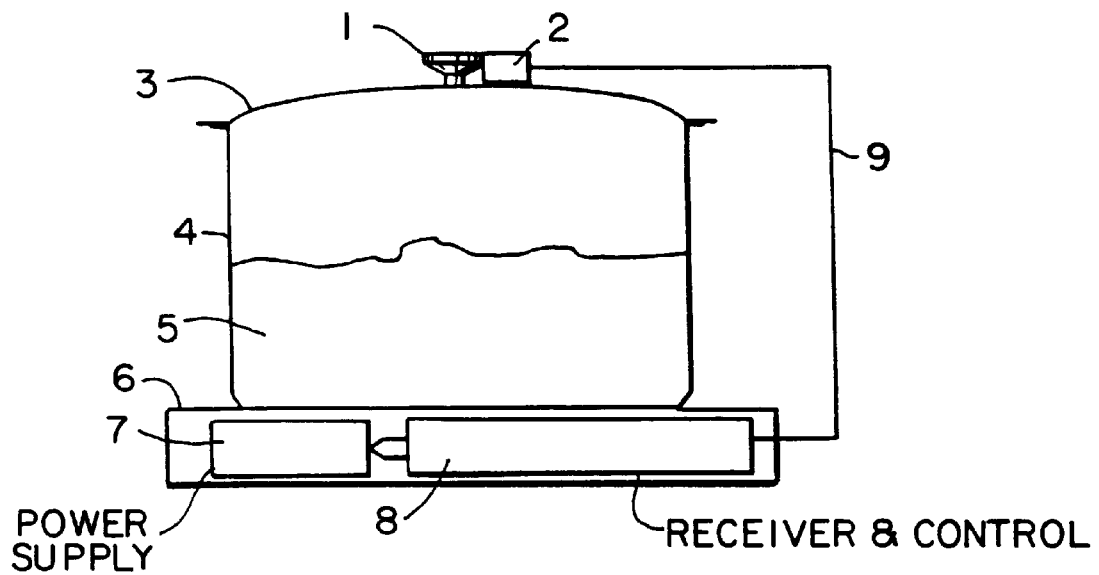

United States Patent
Smrke

[11] Patent Number: 5,951,900
[45] Date of Patent: Sep. 14, 1999

[54] AUTOMATIC TEMPERATURE MEASUREMENT BASED POWER CONTROL DEVICE

[76] Inventor: Albin Smrke, Vodnikova 15, 1235, Dob Pri Domzalah, Slovenia

[21] Appl. No.: 08/930,840
[22] PCT Filed: Apr. 4, 1996
[86] PCT No.: PCT/SI96/00008
§ 371 Date: Oct. 1, 1997
§ 102(e) Date: Oct. 1, 1997
[87] PCT Pub. No.: WO96/31739
PCT Pub. Date: Oct. 10, 1996

[30] Foreign Application Priority Data

Apr. 4, 1995 [SI] Slovenia ................. 9500106
Mar. 22, 1996 [SI] Slovenia ................. 9600097

[51] Int. Cl.⁶ ........................................ H05B 1/02
[52] U.S. Cl. .................. 219/497; 219/494; 219/501; 219/435; 219/431; 340/870 A; 341/176; 99/330
[58] Field of Search ............... 219/411–413, 439, 219/440–442, 497, 496, 505, 494, 431, 432, 435; 99/344, 352, 323.4, 330; 340/870.17, 870.16; 341/176

[56] References Cited

U.S. PATENT DOCUMENTS 3,828,164  8/1974  Fischer et al. ................. 219/431
4,535,229  8/1985  Wolf et al. .................... 219/440
4,740,888  4/1988  Ceste, Sr. et al. ............. 364/187
5,321,229  6/1994  Holling et al. ................. 219/448

FOREIGN PATENT DOCUMENTS 0482446   4/1992   European Pat. Off. .
0541166   5/1993   European Pat. Off. .
0560431   9/1993   European Pat. Off. .
2706050  12/1994   France .
3836099   5/1990   Germany .
2278463  11/1994   United Kingdom .

*Primary Examiner*—Mark Paschall
*Attorney, Agent, or Firm*—Abelman, Frayne & Schwab

[57] ABSTRACT

The automatic temperature measurement based power control device, preferentially on the pot lid, allows for wire or wireless selective power control of one or more power sources through identification of the controlled power source, as well as for the accordingly surveyed food preparation following the pre-set program. The automatic temperature measurement based power control device, referred to in this invention, comprises one or more portable units (20), detachably mounted on the lids (21, 21', 21", . . . ) of the cooking pots (23, 23', 23", . . . ). The portable units (20) allow for wire or wireless one- or two-way communication with the central electronic unit (22 or 22') which is in turn provided with a wire or wireless two-way communication connection with the receiver/transmitter section (24 or 24') of the control units (25, 25') and accordingly with the power sources (26, 26', 26", . . . )

9 Claims, 3 Drawing Sheets

AUTOMATIC TEMPERATURE MEASUREMENT BASED POWER CONTROL DEVICE

The automatic temperature measurement based power control device, preferentially on the pot led, allows for are or wireless selective power control of one or more power sources through identification of the controlled power source, as well as for the accordingly surveyed food preparation foiling the pre-sea programme. The invention has been classified into the F 24C 07/08 and G 05D 23/00 classes of the international patent classification.

The technical problem successfully solved by the device in question involves the design and the construction of the device that will enable pre-set and in-process supervised operation of one or more power sources, such as electric healers, gas heaters, microwave heaters etc. at thermal food processing (cooking, roasting etc.), depending on temperature changing, measured on the lid of the pot where the food is prepared.

There are several known solutions relating to the in-process food preparation control. With pots provided for cooking and roasting on electric and gas heaters of those cooking utensils which due to the cooking technology require the use of the lid, visual checking of the situation in the pot without lifting the lid is impossible, except in case of transparent lids. The cooking or roasting process itself is very sensitive to opening of lids because of vapour and power loss, in particular in cooking processes Without addition of water and/or oil. Well known temperature is control solutions consist of bimetallic and digital thermometers mounted in the lid handle. The heater power level is subject to manual control with reference to the visual information or acoustic signal provided by such devices.

There are also known power level control solutions in the heater itself; they are based on the information on the heater temperature or on the pre-set power changes in the time function. This control type is not precise enough, because the power required for food preparation depends on the size of the pot, on the water quantity, on the food quantity and type, on the room temperature as well as on other factors. In addition to many interdependent parameters, a serious problem is imposed by manual power control which mainly depends on the person and his/her qualification as well as on the controller type and precision. During the operation the attending person shall be constantly present, either watching the bimetallic thermometer or staying somewhere near to be able to hear the acoustic signal produced by the instrument. The respective temperature setting at which the instrument will produce the acoustic signal depends of the attending person and the correct setting is a matter of its experience. Useless power losses are significant and the quality of the device depends on man.

There is a known solution, described in the German patent document DE 2909129, where a special sensor on the lid of the pot allows for temperature measurement on the lid as well as for heater power control by a combination of ultrasonic transmitter & receiver, accompanied by time measurement. The problem not satisfactorily solved by the above solution involves control accuracy and assurance of process continuity; besides, the device is only useful for a certain power location.

The patent document DE 4422354 describes cooking control through infrared pot temperature measurement. Such control depends on the type of the pot used and it requires a specially treated heating plate.

The patent document DE 3836099 describes the system where a special measuring probe takes the temperature inside the cooking pot and, on the basis of the measured values, controls the power supply circuit of the heating spiral. The system allows for control of an exactly specified power source and is not applicable for bigger power sources located at shorter distances.

In addition to the above solutions the described technical problem has been solved by means of special custom designed cooking pots that include both sensor and power elements and have been designed for surveyed food preparation. Such solutions are described, for instance, in the following documents: EP 343 325, EP 541 166, EP 520 565, EP 499 062. All solutions are not universally useful with standard cooking pots nor with standard power sources for thermal food processing.

There, however, exists the solution, described in EP 619 567, where the electronic supervisory system of the cooking plate with several heating elements, which is physically separate from the cooking plate itself, allows for wireless control of power supply to individual heating elements and in its turn provides for control of the cooking plate itself. The system alone does not solve the problem of surveyed food preparation on the cooking plate.

The invention in question solves the problem of control accuracy and personal presence in the food preparation process by mounting the temperature measurement device and the corresponding temperature level indicator on the lid as weal as by placing the receiver, the control electronics and the heater power level control elements into the cooking device. The temperature on the lid is ideal for control because it depends on the heater power, on the pot type, on the food quantity etc. The interconnection between the lid mounted device and the control electronics may be wire or wireless type. In case of wireless data transmission it can be radio, infrared, ultrasonic or laser transmission, or any other remote signal transmission.

The automatic temperature measurement based power control device referred to in this invention consists of the portable unit, detachably mounted on the lid of the pot and allowing for wire or wireless one- or two-way communication with the central electronic unit which is in its turn provided with wire or wireless two-way communication connection with the receiver/transmitter section of the control unit and accordingly with the power source.

In case of big power sources the device is provided with several identical portable units, whereby the central electronic unit detects the location of individual control point. The two-way communication between individual elements involves reception and transmission of date signals and/or operation signals.

Figure 2:
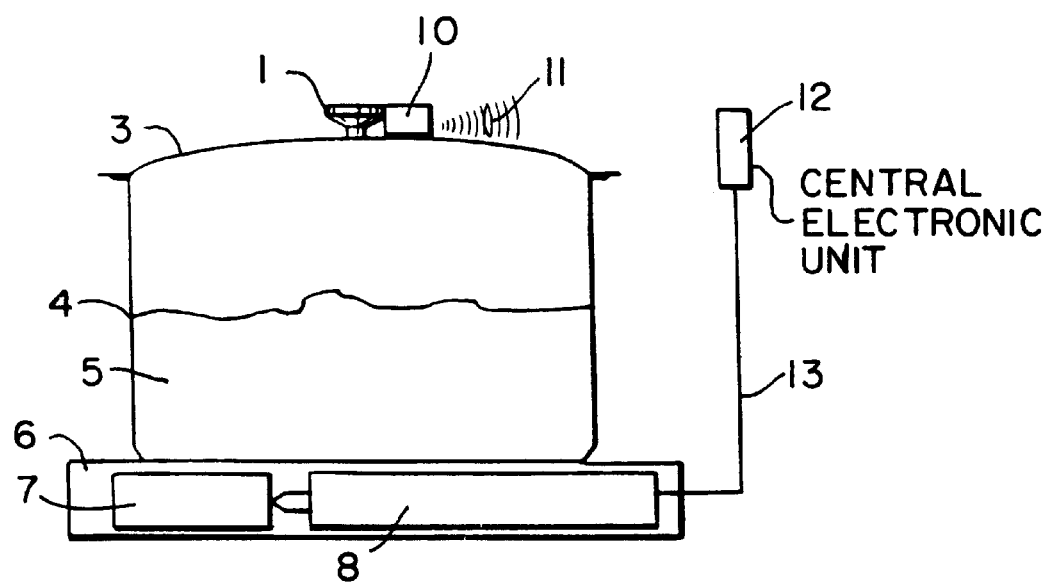
Figure 3:
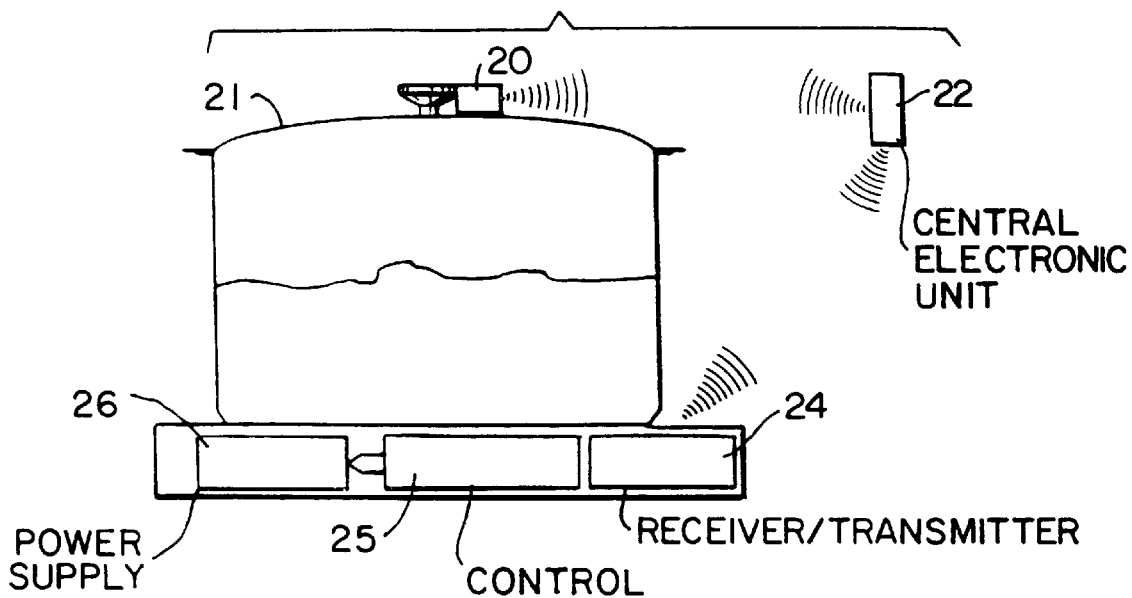
Figure 4:
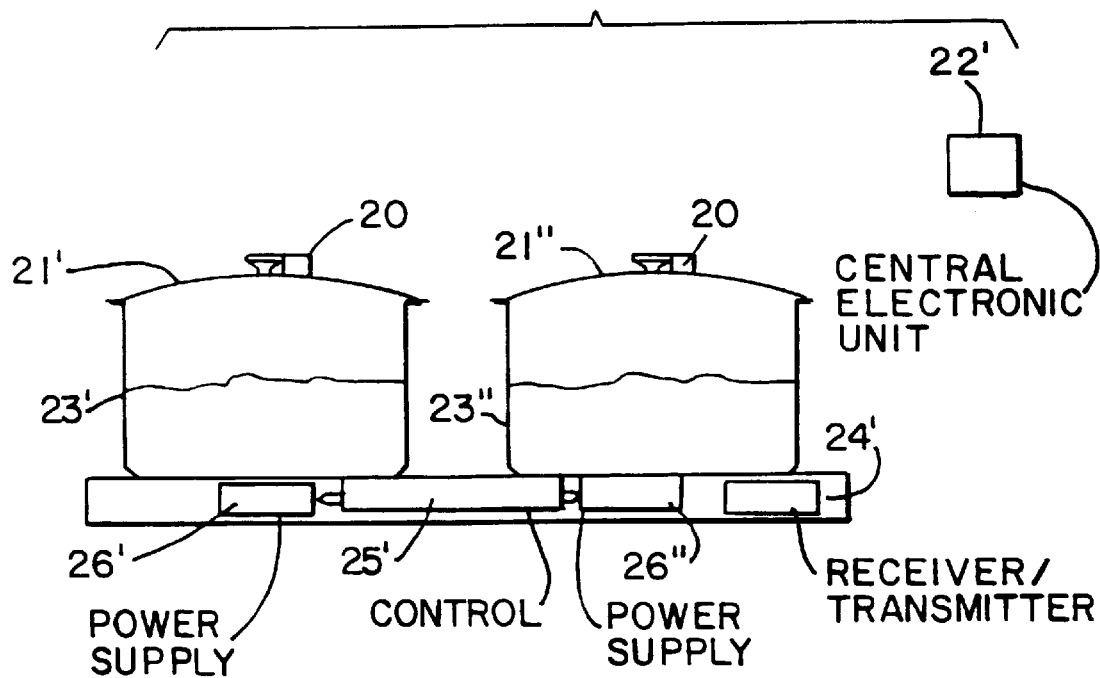
Figure 5:
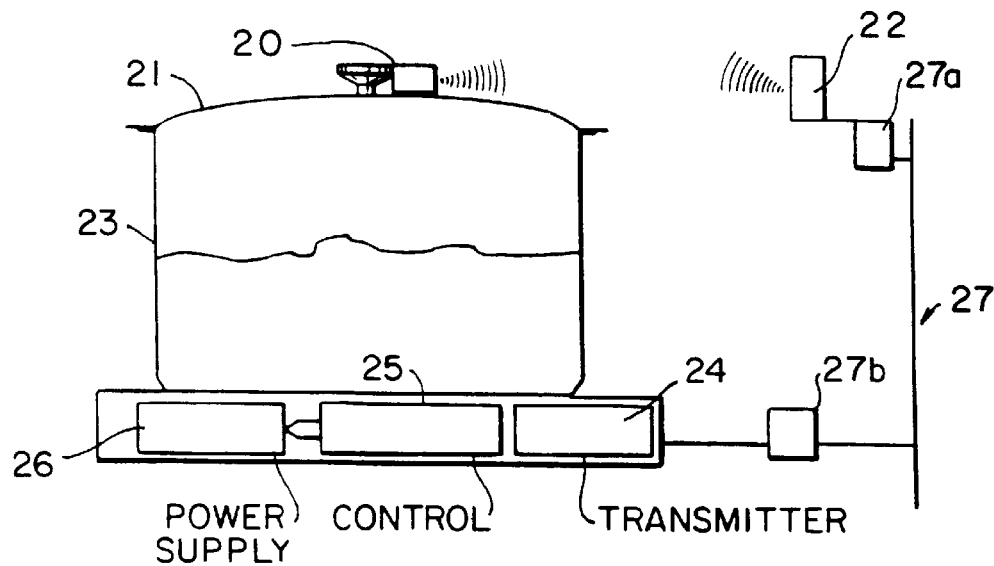
Figure 6:
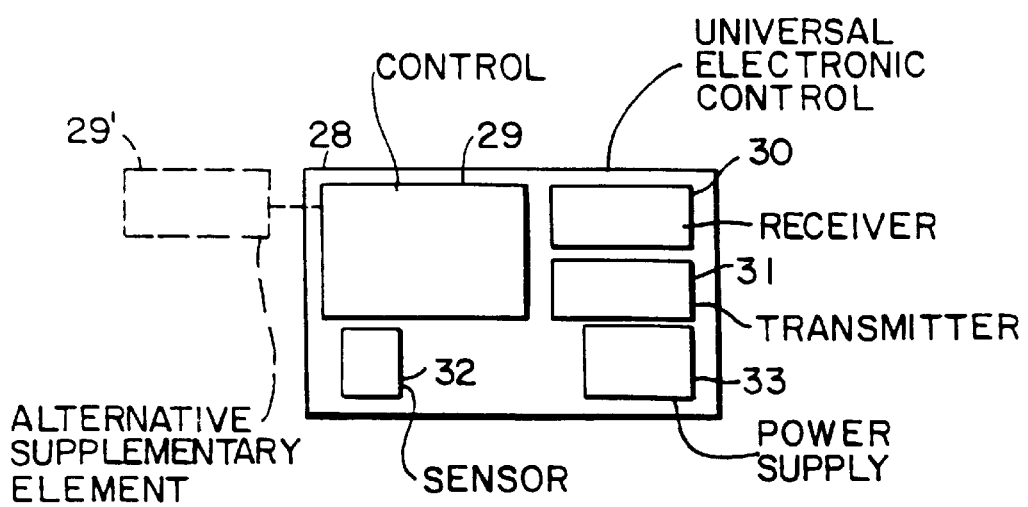

The automatic temperature measurement based power control device referred to in this invention will be explained in detail on the basis of a concrete case and the related pictures showing:

FIG. 1 automatic temperature measurement based power control device including wire connection;

FIG. 2 automatic temperature measurement based power control device including wireless connection;

FIG. 3 diagram of mounting of parts of the device referred to in this invention with a single power source;

FIG. 4 diagram of mounting of parts of the device referred to in this invention with several power sources;

FIG. 5 the device referred to in this invention in combination with the central electronic unit and the control unit via the mains;

FIG. 6 portable unit of the device referred to in this invention as universal electronic control unit.

FIG. 1 shows the automatic temperature measurement based power control device including wire connection on the example of food preparation 5 in the pot 4 with the cooking device 6. On the handle 1 of the lid 3 of the pot 5 or beside the handle 1 there has been mounted the temperature measuring postable unit 2, wire 9 connected to the receiver & control section 8. On the basis of the information on temperature the receiver & control section 8 controls the power source 7 power level via the operating elements.

FIG. 2 shows the automatic temperature measurement based power control device including wireless connection on the example of food preparation 5 in the pot 4 with the cooking device 6. On the handle 1 of the lid 3 of the pot 5 or beside the handle 1 there has been mounted the temperature measuring portable unit 10, including the signal transmitter sending signal 11 to the central electronic unit 12 that may be located inside the cooking device 6 or wire 13 connected to the receiver & control section 8. On the basis of the information on temperature the receiver & control section 8 controls the power source 7 power level via the operating elements.

The automatic temperature measurement based power control device referred to in this invention, shown in FIG. 3, consists of the portable unit 20, detachably mounted on the lid 21 of the cooking pot 23. In addition to the temperature sensor mounted on the portable unit, the portable unit 20 includes the manually or wireless signal controlled programmable electronic circuit for data reception, transmission and processing as well as the elements for communication with other parts of the device referred to in this invention or for reciprocal communication among portable units 20. The central electronic unit 22 is on one end provided with wireless one-way or two-way connection with the portable unit 20, whereas on the other end it is provided with a two-way connection to the receiver/transmitter section 24 of the control unit 25 and through it to the power source 26. The central electronic unit 22 of the device referred to in this invention allows for wireless reception of signals from the portable unit 20 and transmission of signals to the portable unit, for transmission of signals to the receiver/transmitter section 24 and reception of signals therefrom, as well as for programmable setting of temperature and time constants for individual food processing operation. In this way it is possible to set individual thermal food processing operation, to supervise and control it in the terms of power source 26 control through application of the information from the portable unit 20, the central electronic unit 22 as well as from the receiver/transmitter section 24 of the control unit 25.

In case of several power sources 26', 26", . . . the device referred to in this invention and shown in FIG. 4, consists of several identical portable units 20 and of the electronic unit 22' that can detect the location of individual controlled point. Thus the lids 21', 21", . . . of the cooking pots 23', 23" . . . are provided with portable units 20 which are suitable for two-way reciprocal communication and for communication with the central electronic unit 22' which in its turn, with the assistance of a specified programme algorithm, detects the location of the power source occupied by the pot with a specific portable unit 20. The central electronic unit 22' provides for two-way communication with the receiver/transmitter section 24' of the control unit 25' and the latter with individual power sources 26', 26" . . . .

FIG. 5 shows the device referred to in this invention in combination with the central electronic unit 22 and the receiver/transmitter section 24 of the control unit 25 via the mains. In this case the device referred to in this invention also includes the circuit 27, which includes two interfaces 27a and 27b that allow for two-way signal transmission via the mains.

FIG. 6 shows the portable unit 20 of the device referred to in this invention as universal electronic control unit 28. In this case the universal electronic control unit 28 consists of the control section 29, receiver section 30, transmitter section 31, sensor section 32 and power supply section 33.

The control section 29 is a programmable microprocessor element with alternative supplementary element 29' for manual data entry (e.g. keyboard) which processes the signals received from the element 29a, from the receiver section 30 and from the sensor section 32, sending them processed through the transmitter section 31, in wireless mode, to the central electronic unit 22 and/or 22' or to the control sections 25, 25' of power sources 26, 26', 26", . . . .

Depending on the properties of the built-in sensor section 32 the universal electronic control unit 28 can become the universal controller of various processes in the living environment. Beside the temperature sensor section 32 the universal electronic control unit 28 may be provided with a built-in humidity sensor, smoke sensor, motion sensor and any other known sensor that registers the change of the situation.

If the universal electronic control unit 28 is mounted on the refrigerator in the way that the sensor 32 is located in the refrigerating area, the control unit 28 controls the desired refrigerating temperature and the refrigerator power through the transmitter section 31. With the humidity sensor 32 the control unit 28 may be mounted an the kitchen hood; on the electromagnetic water valve it prevents from possible flood; the light sensor 32 controls the lights, the temperature sensor 32 controls the air conditioning or heating equipments. The control unit 28 accompanied by the motion sensor becomes an alarm device and that fitted with a microphone serves as electronic baby-sitter.

Such device communicates with the central electronic unit 22 and/or 22' through wireless two-way communication or through the control section 25 via the mains.

In this case the central electronic unit 22 and/or 22' may become the intelligent common device controlling all processes in the house.

I claim:

1. Automatic temperature measurement based power control device, characterized by the fact that the lid (3) of a pot (4) is provided with the programmable portable unit (2) for temperature measurement, which is connected to the receiver/control section (8) by a wire (9) and the receiver/control section (8) is connected to the power source (7).

2. Automatic temperature measurement based power control device, characterized by the fact that the lid (3) of a pot (4) is provided with a programmable portable unit (10) for temperature measurement through a signal transmitter which transmits the signal (11) to the central electronic unit (12); that the central electronic unit (12) is connected by a wire (13) to the receiver/control section (8) and the receiver/control section (8) is connected to the power source (7).

3. Automatic temperature measurement based power control device, characterized by the fact that the detachable programmable portable unit (20) on the lid (21) of at least one pot (23) is, through wired or wireless one- or two-way communication, connected to the central electronic unit (22), the central electronic unit (22) being connected through wireless two-way communication to the receiver/transmitter section (24) of the control section (25), the control section (25) being connected to the power source (26).

4. Automatic temperature measurement based power control device, as claimed in claim 3, characterized by the fact that the detachable programmable portable units (20) on the lids (21', 21", . . . ) of the pots (23', 23", . . . ) are, through wireless one- or two-way communication, connected to the central electronic unit (22'), the central electronic unit (22') being connected through wireless two-way communication to the receiver/transmitter section (24') of the control section (25') and the control section (25') is connected to the power sources (26', 26", . . . ).

5. Automatic temperature measurement based power control device, as claimed in claim 3, characterized by the fact that any programmable portable unit (20) is, via the central electronic unit (22') and through the receiver/transmitter section (24') of the control section (25'), connected to any power source (26', 26", . . . ).

6. Automatic temperature measurement based power control device, as claimed in claim 3, characterized by the fact that the central electronic unit (22 and/or 22') and the receiver/transmitter section (24 and/or 24') of the control section (25 and/or 25') are connected via the circuit (27) including the interfaces (27*a*, 27*b*).

7. Automatic temperature measurement based power control device, as claimed in claim 3, characterized by the fact that the programmable portable units (20) are connected reciprocally and with the central electronic unit (22 and/or 22') by a wireless connection, as well as with the receiver/transmitter section (24 and/or 24') of the control sections (25 and/or 25') via the circuit (27) including the interfaces (27*a*, 27*b*).

8. Automatic temperature measurement based power control device, as claimed in claim 3 characterized by the fact that each programmable portable unit (20) in the form of a universal electronic control unit (28) includes the control section (29), the receiver section (30), the transmitter section (31), the sensor section (32) and the power supply section (33).

9. Automatic temperature measurement based power control device, as claimed in claim 8, characterized by the fact that the sensor (32) is chosen from the group consisting of a temperature sensor, a humidity sensor, a light sensor, a smoke sensor, a condition modification sensor, a motion sensor or a microphone.

* * * * *